United States Patent
Dhawan et al.

(10) Patent No.: US 9,613,288 B2
(45) Date of Patent: Apr. 4, 2017

(54) AUTOMATICALLY IDENTIFYING AND HEALING SPOTS IN IMAGES

(71) Applicant: Adobe Systems Incorporated, San Jose, CA (US)

(72) Inventors: Anmol Dhawan, Ghaziabad (IN); Atul Aggarwal, Noida (IN); Vishal Verma, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 166 days.

(21) Appl. No.: 14/541,681

(22) Filed: Nov. 14, 2014

(65) Prior Publication Data

US 2016/0140699 A1 May 19, 2016

(51) Int. Cl.
  *G06K 9/40* (2006.01)
  *G06K 9/46* (2006.01)
  *G06T 5/00* (2006.01)

(52) U.S. Cl.
  CPC ............ *G06K 9/4604* (2013.01); *G06T 5/005* (2013.01)

(58) Field of Classification Search
  CPC ......... H04N 5/367; G06T 5/001; G06T 5/002; G06T 5/005

USPC .......................................... 382/275; 348/246
  See application file for complete search history.

(56) References Cited

U.S. PATENT DOCUMENTS

| | | | | |
|---|---|---|---|---|
| 6,160,923 A | * | 12/2000 | Lawton | G06K 9/00234 382/254 |
| 2004/0170337 A1 | * | 9/2004 | Simon | G06K 9/3241 382/164 |
| 2009/0175535 A1 | * | 7/2009 | Mattox | G06T 5/005 382/275 |
| 2009/0202170 A1 | * | 8/2009 | Weiss | G06T 5/005 382/275 |

* cited by examiner

*Primary Examiner* — Andrew Moyer
(74) *Attorney, Agent, or Firm* — Kilpatrick Townsend & Stockton LLP (57) ABSTRACT

Systems and methods are provided for automatically identifying and healing spots in images. In an embodiment, a method receives, at a computing device, a selection of an area of an image, the area having a center. The method includes calculating, by the computing device, pixel values of pixels in the selected area and determining, based at least in part on the calculated pixel values, a threshold value. The method further includes detecting, based at least in part on comparing pixel values in the selected area to the threshold value, one or more spots in the selected area. The method also includes creating, by the computing device, a mask for the one or more spots. The method replaces pixels in the mask with non-spot pixels.

20 Claims, 7 Drawing Sheets

AUTOMATICALLY IDENTIFYING AND HEALING SPOTS IN IMAGES

TECHNICAL FIELD

This disclosure relates generally to computer-implemented methods and systems for editing images and more particularly relates to automatically identifying and healing spots (e.g., blemishes and other imperfections) in images.

BACKGROUND

Graphics content, such as digital images and photographs, can be edited using imaging applications such as Adobe® Photoshop®. Anomalies in graphics can be manually removed using spot healing tools provided by such applications. Traditional spot healing techniques require a user to manually select or mark an area on an image to be replaced. For example, a spot or blemish in an image can be marked for replacement using a brush tool, such as the Spot Healing Brush in Adobe® Photoshop®. Current solutions for spot healing replace a manually selected area inside a brush with another area from the image. Currently, a user must manually select and control the brush size so that the entire spot to be healed is contained in the area marked by the brush. Existing spot healing solutions require the user to make appropriate adjustments to the brush size as spot healing progresses.

For irregularly shaped spots, a user needs to select a brush large enough to cover the whole area, or select a smaller brush size and manually fix smaller parts of the spot one at a time. Adobe® Photoshop® Lightroom and Adobe® Photoshop® provide a spot healing brush tool that enables a user to select a brush size. Current spot healing techniques using the above mentioned steps and tools can work on desktop computing platforms and devices, which may allow the user to change the brush size and use a mouse or pointing device to precisely select an area of an image. However, there are issues using current techniques in some environments and platforms, such as mobile devices and applications and touch screen devices. One issue is the difficulty of precisely selecting a spot using a touch input (e.g., a tap). For example, a user may not be able to tap on the precise location of a spot on a touch screen. This issue is compounded when the complete image is displayed (zoomed-out) on a relatively small display (e.g., a screen of a mobile device). Screen space can be an issue with mobile devices, and this issue is compounded for imaging applications where a designer seeks to give the maximum space to the image on the screen. Displaying additional icons, such as tool and brush icons, on some screens can add to the complexity of a user interface, and also use screen space that would otherwise be used to display an image being edited. Another issue with existing solutions is their complexity. Users of mobile imaging applications typically expect a simple user interface with fewer things to learn. Interactions to mark an image area, and to select and adjust brush sizes add to the complexity of current spot healing workflows.

Therefore, there is a need for improved techniques for automated, accurate spot identification and spot healing. There is also a need for systems and methods for automatically identifying and healing spots in images being edited using touch inputs and in mobile environments.

SUMMARY

According to certain embodiments, systems and methods are provided for automatically identifying and healing spots in images. In accordance with some embodiments, a computing device can perform a method for identifying and healing spots in an image. The computing device can receive a selection of an area of an image, the area having a center. The method includes calculating, by the computing device, pixel values of pixels in the selected area, and then determining, based at least in part on the calculated pixel values, a threshold value. The method further includes detecting, based at least in part on comparing pixel values in the selected area to the threshold value, one or more spots in the selected area. The method also includes creating, by the computing device, a mask for the one or more spots. The method heals the one or more spots in the image by replacing spot pixels in the mask with non-spot pixels.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Computer-implemented systems and methods are disclosed for automatically identifying and healing spots in images. Some embodiments automatically detect the spots by analyzing an area of the image, where the area can be a user-selected area. In one embodiment, the area can be selected using a touch input (e.g., a tap on a touch screen display that is displaying an image).

Certain embodiments assist in solving the problem of inaccurate user selections (e.g., touch inputs and taps) while also eliminating the need for choosing a brush size in order to fix spots or blemishes in an image. These embodiments can also help to keep a user interface (UI) of an imaging application clean (e.g., less cluttered) by eliminating the need to display a brush size option in the UI.

An embodiment automatically chooses an appropriate spot mask size instead of using a fixed geometrical shape, such as a user-selected circle or ellipse. This improves spot healing results and efficiency by limiting the spot mask to identified spot pixels.

The following non-limiting examples are provided to help introduce the general subject matter of certain embodiments. An imaging application executed by a server or other computing system can be used to edit images (e.g., graphics, images, and digital photographs) presented in electronic form. For example, the imaging application can be Adobe® Photoshop® Express.

Figure 1:
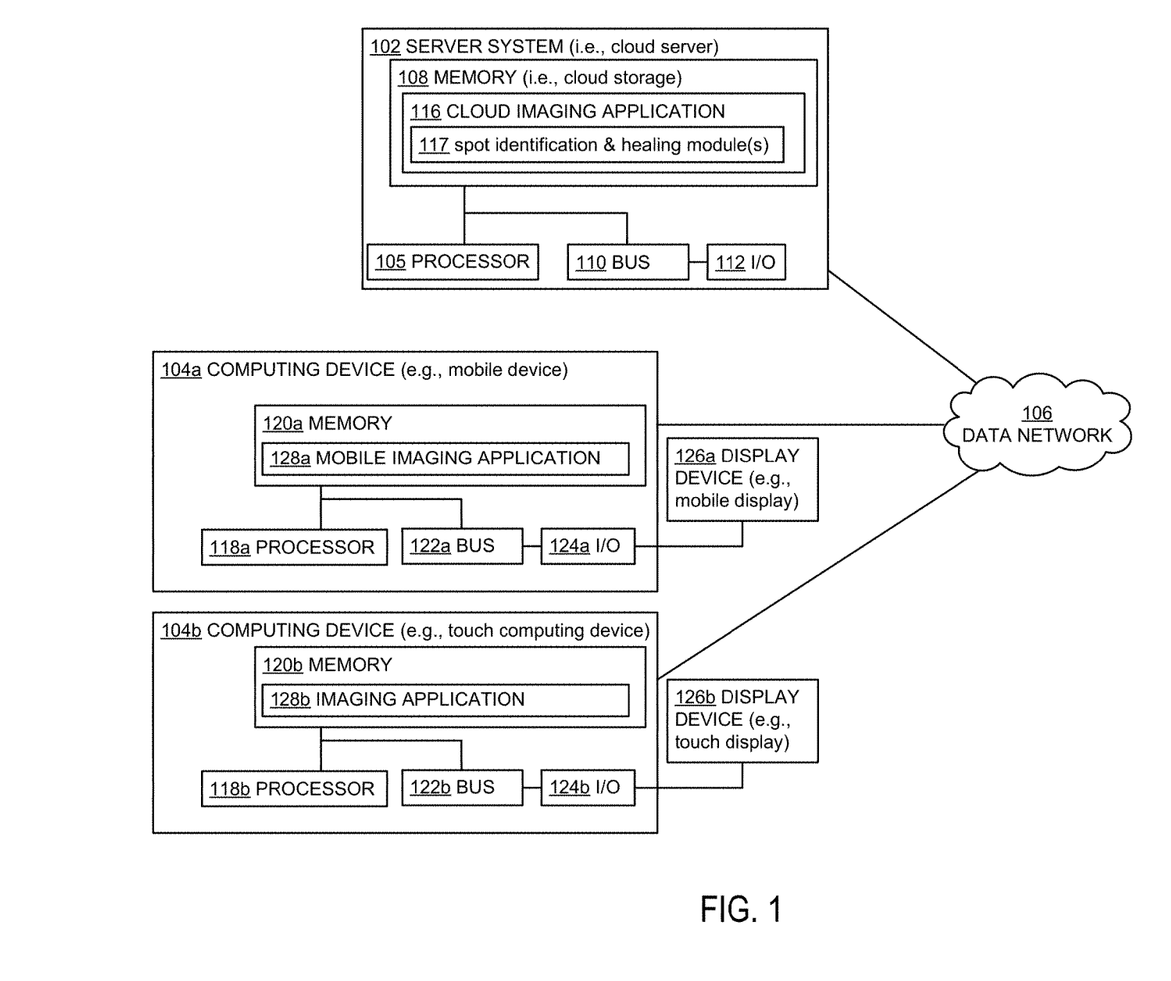
FIG. 1 is a block diagram depicting exemplary computing devices and systems for implementing certain embodiments.

In some non-limiting embodiments, when a user taps on a spot on a computing device (e.g., a mobile computing device 104a and/or a touch-sensitive device 104b as shown in FIG. 1), a method will try to accurately identify and fix the spot in that area. An embodiment accomplishes this by creating a spot mask. The spot mask is created by classifying each pixel in a predefined candidate area (e.g., a 'parent area') as being part of the spot or not. In cases where a spot has a smaller size than the selected area (e.g., the tapped area), the spot mask for replacing spot pixels with other pixels of the image is created so that the mask has a shape and dimensions similar to the actual spot contained in the tapped area. For spots which are larger in size, an embodiment grows the candidate area side along one or more sides of the candidate area until the candidate area contains all of the spot.

In an embodiment, a method for spot healing first determines the center of a spot. This can be performed in order to account for the relative lack of precision when a user selects a spot. The lack of precision can result when the user is using an imaging application on a mobile device. For example, on mobile devices, the precision of spot selection is typically not very high when selecting a point in a displayed image (e.g., tapping on a point on a relatively small display of the mobile device). In some embodiments, in an area surrounding a selected/tapped point, a spot differs from a majority of the pixel values of an image containing the spot. According to these embodiments, the area surrounding the tapped point is related to the spot, and the spot pixels differ from a majority of the image's pixels that surround the spot. These embodiments can include creating a binned histogram for an area surrounding a tapped point, or the entire image. The histogram can include bins for pixel colors in the image and can be used to determine that pixels that differ from or are apart from the areas of most frequent color. Pixels that differ from the most frequent colors in the histogram can be identified as candidates to be included in a spot area. The spot area can be a region including the identified, candidate pixels. Then, a center of the spot area can be determined. For example, the geometric center of the spot area can be determined to be the center of the spot area. In additional or alternative embodiments, in cases where there are multiple or unclear candidates, the tapped point can be selected as the center or origin of the spot area. A pixel located at the center of the spot area can be designated as a center pixel.

Next, the method calculates pixel values of the tapped area. Since there might be some errors in values for a certain pixel in the tapped area, or some error in the tap for a mobile device, an embodiment can take the average value for pixels in a diameter of around the center pixel. This center pixel can be denoted as $P\_0$. In one embodiment, the diameter around $P\_0$ is 7 pixels.

In order to match the similarity of surrounding pixels, an embodiment determines a threshold pixel value (threshold value). In one embodiment, the threshold value can be based on independent thresholds for three color information channels present in the image being edited. For example, color information channels can be one of three types of channels, where each channel type can store different types of information about the image. In an embodiment, a first channel type is a color information channel. Color information channels can be created automatically when a user opens an image, and the image's color mode can determine the number of color channels created. For example, an RGB image has a channel for each color (red, green, and blue) plus a composite channel used for editing the image. A second type of channel is an alpha channel. Alpha channels store selections as grayscale images. Alpha channels can be added to create and store masks, which enable manipulation or protection of parts of an image. A third type of channel is a spot color channel. Spot color channels specify additional plates for printing with spot color inks. According to an embodiment, an image can have up to 56 channels, where all new channels have the same dimensions and number of pixels as the original image. In an example with the RGB image, the threshold value can be determined based on the independent thresholds for the image's red, green, and blue color information channels.

Because different spots in an image might have different kinds of textures, having a predetermined, fixed threshold can be difficult and/or impractical. An embodiment addresses the issues with using a fixed threshold by analyzing the area around the center pixel (e.g., $P\_0$) and then determining a threshold depending on the pixel variance within the region of the image. According to embodiments, if the pixel value variance is higher, then so are the threshold values, and lower pixel variance results in lower thresholds.

After the threshold value is determined, an embodiment looks in an area of predefined size (e.g., a 'parent area') around the center pixel and classifies each pixel as being part of the spot or not, depending on whether the pixel being classified is within the threshold value. The pixels classified as being part of the spot will have pixel values above the threshold value, and pixels classified as not being part of the spot will have pixel values within the threshold value. The size of the predefined, parent area can be related to a zoom level the image is currently under. For example, if the image is zoomed in, then the parent area is smaller. Similarly, if the image is zoomed out, the parent area will be larger.

Once the spot pixels in the parent area have been classified, the method can be certain that if the spot was encompassed in that parent area, then it has been included in a spot mask. However, in certain scenarios, the spot may still be larger than the parent area. That is, some portion of the spot can be overflowing from at least one edge of the parent area. Embodiments handle such scenarios by looking near the edges of the parent area for pixels which are part of the spot mask. If an edge of the parent area has spot pixels near it, then the method can expand the size of the parent along the direction of referenced edge. In one embodiment, the increase is done in 25% increments (e.g., the parent area is expanded along the referenced edge by 25%). According to some embodiments, the method then repeats the determining of a threshold pixel value for the new area that has been introduced as part of the expanded parent area.

In some embodiments, the steps of determining a threshold value and expanding the parent area can be repeated until the parent area has reached an upper bound. In one embodiment, the parent area can be expanded until all of its sides are twice their original size. In an additional or alternative embodiment, the parent area can be expanded until the spot being fixed is 20% of the size of the image object being edited. The parent area growth may be limited because results for replacing too large of a portion in an image at a single time might not be ideal. That is, some embodiments avoid replacing more than 20% of the pixels of an image as part of spot healing. For example, if it is detected that an image object that is being fixed has a certain area, then an upper limit of size of a spot being healed or fixed can be kept at 20% of the size of the object.

Certain embodiments seek to reduce the number of false positives (e.g., pixels misclassified as being part of a spot) by tightening the threshold when classifying the pixels in an extended parent area. This results in having a higher confidence level for the pixels being marked as part of the spot.

In some embodiments, adaptively modifying the size of a parent area and a spot mask within the parent area can provide more efficient use of computing and network resources involved in spot healing for images. Adaptively modifying the size of parent area or spot mask for an image can increase the efficiency of spot healing. Incrementally increasing the parent area by in sufficient directions and amounts to envelope a spot can allow fewer pixels to be replaced in an image. This can allow less data for the edited image to be transmitted via a data network and decrease the overall amount of data traffic over a network attributable to transmitting the image data. Thus, in some embodiments, adaptively adjusting the parent area and/or the spot mask for an image presented in an imaging application can provide improved performance in data networks.

Example System Implementation

Referring now to the drawings, FIG. 1 is a block diagram depicting example computing devices and systems for implementing certain embodiments. FIG. 1 depicts an example of a system that includes a server system 102 that executes a cloud imaging application 116 for identifying and healing spots in image content. As shown, cloud imaging application 116 can include a module 117 configured to identify and heal spots in an image. The functionality of module 117 can be implemented by one or more sub-modules. The image content can be provided by, or sent to one or more client devices such as computing devices 104a and 104b. As shown in the example of FIG. 1, mobile computing device 104a can be embodied as a mobile device having a mobile display 126a, and touch computing device 104b can be embodied as a touch computing device having a touch display 126b. The example computing systems include a server system 102. Non-limiting examples of server system 102 include a server computer, a server farm, a cluster of server computers, etc.

The exemplary computing devices include computing devices 104a, 104b in communication via a data network 106. Computing devices 104a, 104b can be, but are not limited to, a personal computer (PC), a Personal Digital Assistant (PDA), a tablet computing device, an iPhone®, an iPod®, an iPad®, a device operating the Android operating system (OS) from Google Inc., a device running the Microsoft Windows® 8 OS, a device running the Microsoft Windows® Phone OS, a mobile phone, a BlackBerry® device, a smartphone, a hand held computer, a netbook computer, a palmtop computer, a laptop computer, an ultra-mobile PC, a portable gaming system, or another similar type of mobile computing device having a capability to communicate with a cloud service hosted by server system 102, and/or via the data network 106 shown in FIG. 1. In some embodiments, the computing devices 104a, 104b can each be the same type of computing device. In other embodiments, the computing devices 104a, 104b can be different types of computing devices.

The computing devices 104a, 104b can each be in communication with the server system 102 via a data network, such as the Internet or the data network 106 shown in FIG. 1. In some embodiments, the computing devices 104a, 104b can access a cloud-based imaging application 116 provided by the server system 102. In other embodiments, the computing devices 104a, 104b can each access a local imaging application 128a or 128b independently from one another. Each of imaging application 128a and 128b can include a module similar to module 117 that is configured to identify and heal spots in an image.

The computing devices 104a, 104b can render an image for display. An image can include an item of electronic content, such as (but not limited to) a digital photo, a vector graphic, a raster graphic, or another type of image to be edited. The computing devices 104a, 104b can render the image via any suitable application, such as, but not limited to, Adobe® PhotoShop®, Adobe® Photoshop® Mix, and Adobe® Photoshop® Lightroom mobile.

Each of the computing devices 104a, 104b can be configured to receive inputs from an input device for selecting, modifying, or otherwise using images. The input device can include any suitable device configured for providing input data, selecting portions of an image, and/or providing control signals to the computing devices 104a, 104b. Non-limiting examples of an input device include a finger and a stylus configured to provide touch inputs to a touch screen device, such as touch display device 126b shown in FIG. 1.

The server system 102 includes a processor 105. The processor 105 may include a microprocessor, an application-specific integrated circuit (ASIC), a state machine, or other suitable processing device. The processor 105 can include any number of computer processing devices, including one. The processor 105 can be communicatively coupled to a computer-readable medium, such as a memory 108. The processor 105 can execute computer-executable program instructions and/or accesses information stored in the memory 108. The memory 108 can store instructions that, when executed by the processor 105, cause the processor to perform operations described herein.

A computer-readable medium may include (but is not limited to) an electronic, optical, magnetic, or other storage device capable of providing a processor (see, e.g., the processor 704 of FIG. 7) with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The server system 102 may also include a number of external or internal devices, such as input or output devices. For example, the server system 102 is shown with an input/output (I/O) interface 112. A bus 110 can also be included in the server system 102. The bus 110 can communicatively couple one or more components of the server system 102. In the non-limiting example of FIG. 1, the server system 102 can be embodied as a cloud server hosting a cloud imaging application 116. In one embodiment, cloud imaging application 116 can be Adobe® Photoshop®.

Each of the computing devices 104a, 104b includes respective processors 118a, 118b. Each of the processors 118a, 118b may include a microprocessor, an ASIC, a state machine, or other processor. In the non-limiting example of FIG. 1, the computing devices 104a, 104b can be embodied as touch computing devices such as an iPad®, iPhone® or other tablet device or smart phone having a touch sensitive surface. Each of the processors 118a, 118b can include any of a number of computer processing devices, including one. Such a processor can include or may be in communication with a computer-readable medium. As depicted in FIG. 1, each of the processors 118a, 118b is communicatively coupled to respective memories 120a, 120b. Each of the processors 118a, 118b respectively executes computer-executable program instructions and/or accesses information stored in the memories 120a, 120b. The memories 120a, 120b store instructions that, when executed by the processor, cause the processor to perform one or more operations described herein.

The computing devices 104a, 104b may also comprise a number of external or internal devices such as a mouse, a CD-ROM, DVD, a keyboard, a display, audio speakers, one or more microphones, or any other input or output devices. For example, each of the computing devices 104a, 104b is respectively shown with I/O interfaces 124a, 124b and display devices 126a, 126b. A non-limiting example of a display device is a computer monitor or computer screen, such as a touch screen. In the non-limiting example of FIG. 1, the display devices 126a, 126b can be embodied as touch display devices. Although FIG. 1 depicts the display devices 126a, 126b as separate devices coupled to the computing devices 104a, 104b, the display devices 126a, 126b can be respectively integrated into the computing devices 104a, 104b.

Buses 122a, 122b can be respectively included in the computing devices 104a, 104b. Each of the buses 122a, 122b can communicatively couple one or more components of the computing devices 104a, 104b.

FIG. 1 also illustrates the cloud imaging application 116 comprised in the memory 108 of the server system 102 and the client imaging applications 128a, 128b respectively comprised in the memories 120a, 120b of the computing devices 104a, 104b. The cloud imaging application 116 stored in the memory 108 can configure the processor 105 to manage and provide a cloud service accessible by the client imaging applications 128a, 128b. In the non-limiting example of FIG. 1, the memory 108 can function as cloud storage. In alternative embodiments, cloud storage can be implemented as a separate cloud storage device. The cloud storage device can be implemented as one or more file servers, one or more database servers, and/or one or more web servers that form part of the server system 102. The cloud imaging application 116 can include one or more modules for storing, modifying, providing, or otherwise using images in a cloud service accessed by the client imaging applications 128a, 128b. The cloud storage device can be implemented as a virtual, network-accessible storage device used by the cloud imaging application 116 to store, modify, and provide images in a server-based clipboard service accessed by the client imaging applications 128a, 128b. A non-limiting example of a cloud imaging application 116 is Adobe® Photoshop® provided via Adobe® Creative Cloud server software.

Each of the client imaging applications 128a, 128b can include one or more software modules for establishing communication with a cloud imaging application 116. Each of the client imaging applications 128a, 128b can also include one or more software modules for performing functions in addition to establishing communication with the cloud imaging application 116. For example, each of the client imaging application 128a, 128b can be an image manipulation application having a software module for communicating with the cloud imaging application 116. In some embodiments, each of the client imaging application 128a, 128b can be a different type of application including different functionality. For example, a client imaging application 128a can be the Adobe® Photoshop® Lightroom mobile application and a client application 128b can be Adobe® Photoshop® Mix or the Adobe® Photoshop® Express application. In some embodiments, the client imaging applications 128a, 128b can be stand-alone applications. In other embodiments, the client imaging applications 128a, 128b can be embedded in another application, such as an image manipulation application.

The server system 102 can include any suitable server or computing device for hosting the cloud imaging application 116. In one embodiment, the server system 102 may be a single server, such as a web or application server. In another embodiment, the server system 102 may be presented as virtual server implemented using a number of server systems connected in a grid or cloud computing topology.

The computing devices 104a, 104b can include any suitable computing device or system for communicating via a data network 106 and executing the client imaging applications 128a, 128b. Non-limiting examples of a suitable computing device or system include a desktop computer, a tablet computer, a smart phone, or any other computing device or system suitable for using electronic content.

Although FIG. 1 depicts the computing devices 104a, 104b as separate from the server system 102 for illustrative purposes, other implementations are possible. For example, in some embodiments, a server system 102 can be accessed by different computing devices 116 in different domains (e.g., unrelated devices having different application accounts that are stored on or accessible to the server system 102).

Computing devices 104a, 104b can include any computing device that can receive or otherwise access one or more images that the server system 102 transmits or to which the server system 102 otherwise provides access by the computing devices 104a, 104b (e.g., by transmitting a link to an image file or image object).

Although FIG. 1 depicts a server system 102 that executes and hosts cloud imaging application 116, other implementations are possible. In some embodiments, one or more operations of the cloud imaging application 116 can be distributed among a server system 102 and one or more computing devices 104a, 104b. For example, a server-based cloud imaging application 116 stored on the server system 102 can be executed to provide an image presented at a mobile computing device 104a. A mobile imaging application 128a executed on mobile computing device 104a can communicate with the cloud imaging application 116 to receive a copy of an image to be edited. In additional or alternative embodiments, the mobile imaging application 128a can download or otherwise obtain the image from another system (e.g., touch computing device 104b or a remote device).

Example Processes and Workflows

Figure 2:
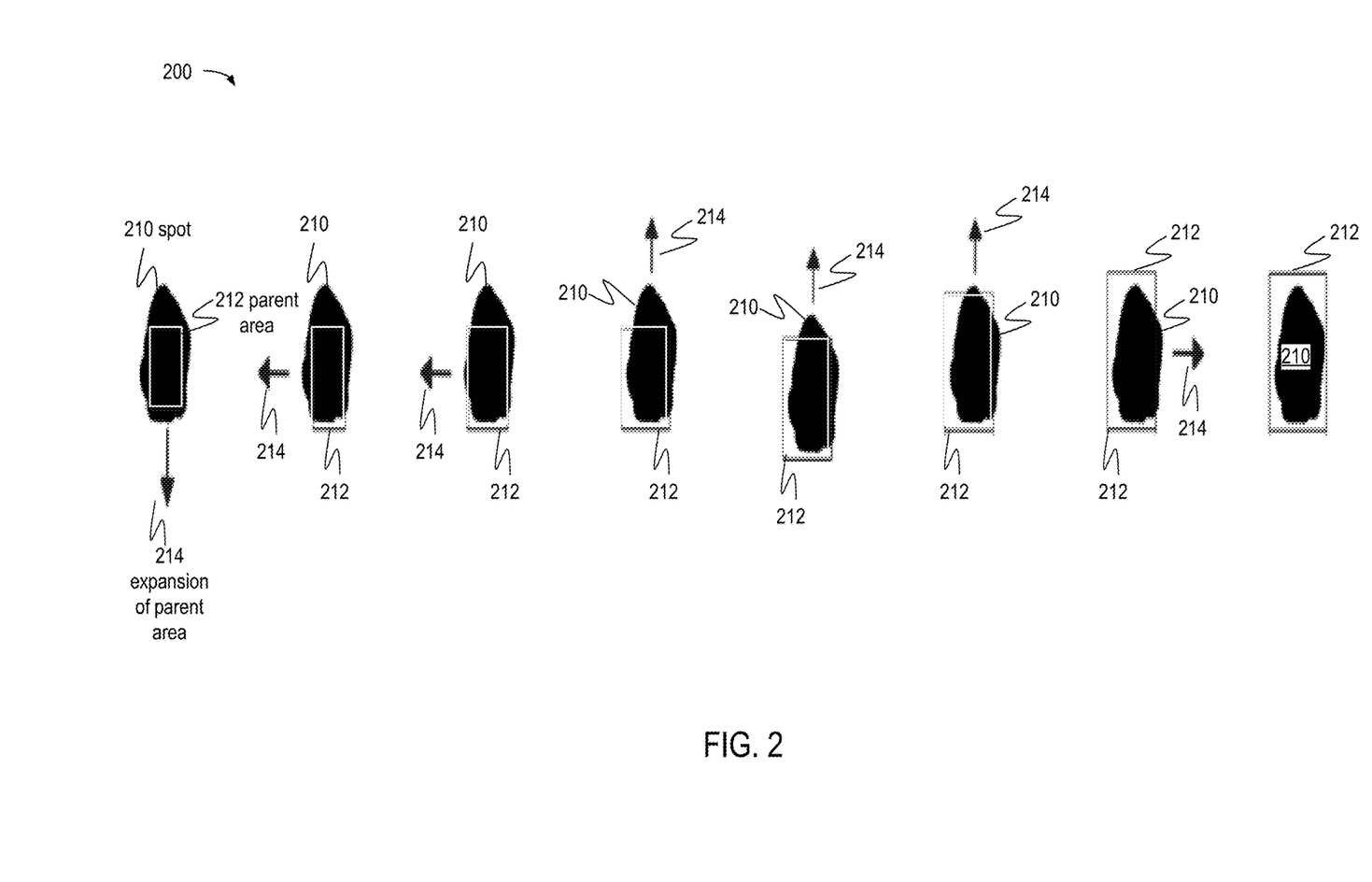
FIG. 2 is a diagram depicting an example process for automatically identifying an area of an image containing a spot, in accordance with various embodiments.

FIG. 2 is a diagram depicting an example process 200 for automatically identifying an area of an image containing a spot 210. In particular, FIG. 2 depict an example process for identifying a parent area 212 in a portion of an electronic image having a spot 210 and sizing the parent area 212 so that it contains all of pixels of spot 210. As shown, parent area 212 can initially be an area of predefined size around a center pixel of spot 210. Although the example parent area 212 in FIG. 2 is depicted as being rectangular, it is to be understood that the parent area can have other geometric shapes and the expansion can happen in certain predefined directions or angles. The image including spot 210 can be an image being viewed and edited within an imaging application, such as cloud imaging application 116 that provides access to an image by one or more of the computing devices 104a, 104b. The image can be, for example, a digital photograph including one or more spots 210 to be healed.

In some embodiments, as depicted in FIG. 2, a parent area 212 can be automatically expanded so that it encompasses all of a spot 210. As shown, each side of parent area 212 can be sequentially expanded using a series of expansions 214 to cover up the spot 210. The expansions 214 can each be in a respective direction (e.g., downward, leftward, upward, or rightward with respect to a bottom, left, top, or right edge of parent area 212).

As can be seen in FIG. 2, a first part of process 200 determines if there is a need for a downward expansion 214. That is, process 200 can begin by expanding the size of parent area 212 in a downward direction. This determination can be based on detecting the intersection of spot pixels with edges of parent area 212. In one example, an intersection is detected when a pixel classified as being included in spot 210 overlays or is collocated with an edge of parent area 212. That is, if spot 210 touches the bottom edge of parent area 212, process 200 determines that parent area 212 does not encompass all of spot 210 and the parent area 212 needs to expand downward. In certain embodiments, the parent area 212 and/or spot 210 can have overall size constraints. For example, the parent area 212 can be constrained so that it is not expanded to double or triple its original size. According to an example embodiment, one implementation of process 200 never increases the sides of the parent area 212 by more than double their original size. Thus, according to this example embodiment, it is possible that part of some bigger spot still remains unfixed. Also, for example, an upper limit of size of spot 210 can be fixed at 20% of the size of the image object that contains spot 210. If the size constraints permit expansion 214 of parent area 212 in direction, then process 200 increases parent area 212 downward.

Once parent area 212 has been expanded downward so that it does not need to expand downward further, process 200 checks on the left side of parent area 212. In the example shown in FIG. 2, parent area 212 is expanded or grown in 25% increments in a given direction on a side of parent area 212. In an embodiment, a parent area 212 may be limited to two expansions 214 on one side in a given direction. After expanding in the left direction until the left edge of parent area 212 no longer touches spot 210, process 200 then proceeds to check the upper and right sides for intersections between parent area 212 and spot 210.

As seen in FIG. 2, process 200 can repeat expansions 214 of parent area 212 in downward, upward, leftward, and rightward directions as needed until no edges of parent area 212 touch portions of spot 210.

As shown in FIG. 2, it is possible after the expanding parent area 212 in the downward and leftward directions, there are some points on the spot 210 which were not marked as part of the spot. If this is the case, process 200 can mark any such points as spot pixels. In one embodiment, pixels which have 4 or more surrounding pixels already marked as part of spot 210 are classified as being spot pixels.

After the expansions 214, process 200 has a parent area 212 which covers the spot 210 efficiently. This expanded parent area 212 can be used to create a mask for healing spot 210. An example process for creating a spot mask is described below with reference to FIG. 3.

Figure 3:
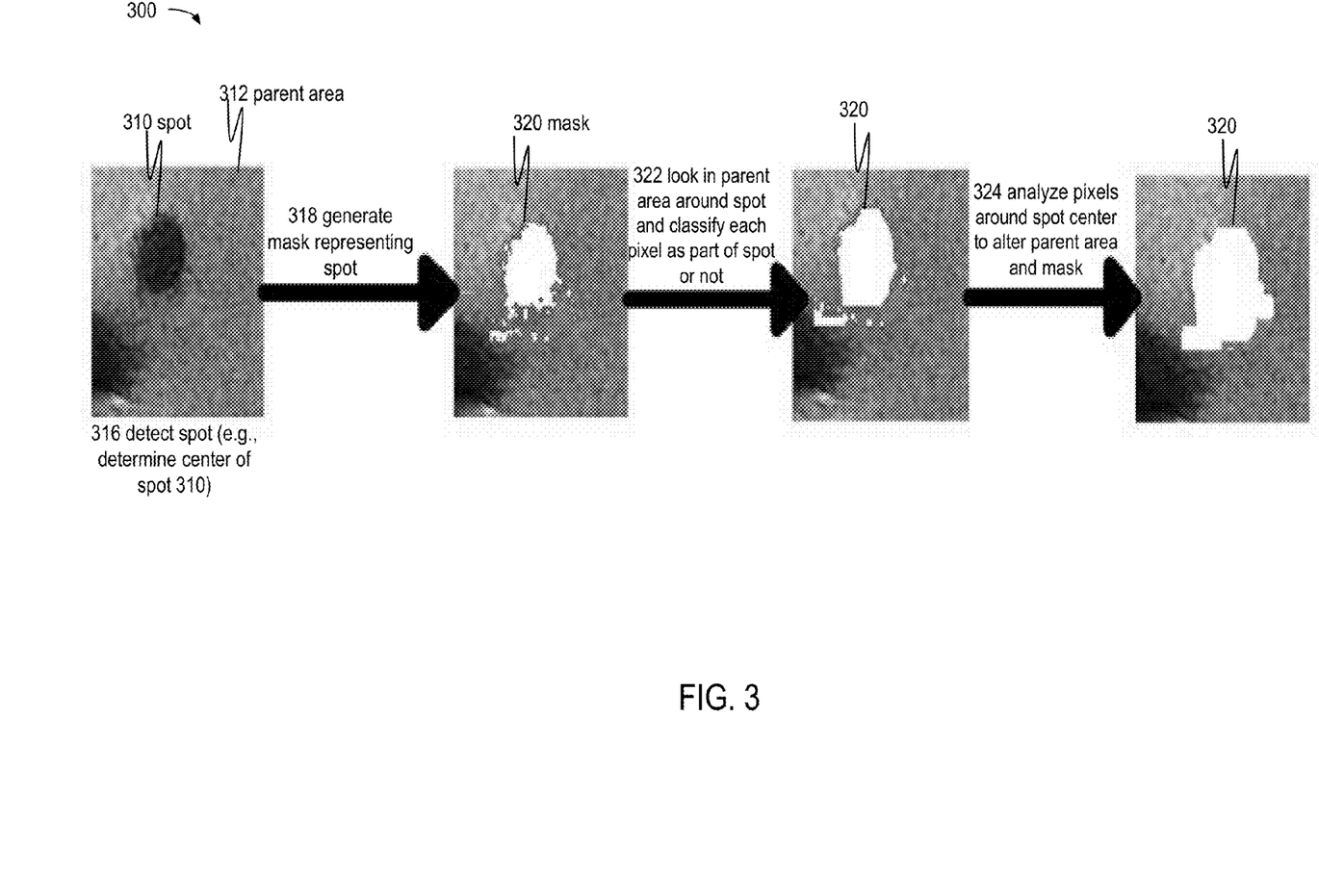
FIG. 3 is a diagram depicting an example process for automatically creating a mask for healing a spot in an image, in accordance with various embodiments.

FIG. 3 is a diagram depicting an example process 300 for automatically creating a mask 320 for healing a spot 310 in an image. For illustrative purposes, FIG. 3 depicts certain examples of different steps used for detecting and healing a spot in an imaging application. Additional options and operations for automatically identifying and healing spots are described with respect to FIGS. 4-6 below.

As shown in FIG. 3, process 300 begins at step 316 where spot 310 is detected. Step 316 can include determining a center of spot 310. The geometric center of spot 310 can be determined to be the center of the spot. Alternatively, a tapped point in spot 310 can be selected as the center of the spot. Next, step 318 is performed to generate mask 320 representing spot 310. Step 318 can include generating mask 320 so that the mask completely or substantially coincides with the shape of spot 310. That is mask 320 is sized and shaped based on the size and shape of spot 310 instead of being a fixed geometrical shape such as circle or ellipse. Mask 320 can overlay or hide pixels of spot 310. Mask 320 is nondestructive because the pixels of spot 310 are not lost or overwritten at the time the mask is generated. Then, step 322 looks in parent area 312 around spot 310 and classifies each pixel as being part of spot 310 or not. As described above, this classification can comprise comparing each pixel's value to a determined threshold value. For example, pixels classified as being part of spot 310 in step 322 will have pixel values above the threshold value, and pixels classified as not being part of spot 310 will have pixel values within the threshold value. After the pixels are classified as being part of spot 310 (or not), step 324 is performed to analyze pixels around the spot 310 to enlarge mask 320. As discussed in the following paragraph, step 324 can be performed using a region-growing algorithm.

When trying to find a candidate area in an image to replace spot 310 with, process 300 can match the pixels on the boundary of the mask. The candidate area can be an area of the image surrounding mask 320, where the candidate area is automatically selected based on its pixel values (e.g., pixel values not classified as being part of spot 310) and proximity to mask 320. Alternatively, the candidate area can be a user-selected area of the image. That is, process 300 can find pixels in a candidate area of the image that will be used to replace the spot pixels. For this purpose, process 300 creates a mask 320 that is slightly bigger than the actual spot 310. To accomplish this, process 300 can use a region-growing algorithm. In one example, process 300 can implement a region growing algorithm that considers all the pixels that have already been classified as part of spot 310, and then marks all the pixels in a 7×7 pixel square centered on the pixel as being part of the mask 320 which defines spot 310. This embodiment ensures that mask 320 for spot 310 grows in size by 3 pixels outward on all sides.

By using the steps shown in FIGS. 2 and 3, embodiments implement spot area detection and spot mask creation. Additional or alternative embodiments can perform processes 200 and 300 using similarity matching, adaptive thresholds, region filling and region growing. For example, similarity matching and adaptive thresholds can be used for spot area detection. Also, for example, region filling and region growing can be used for spot mask creation. Such similarity matching, adaptive thresholds, region filling and region growing can be implemented in an imaging application, such as, for example the Adobe® Photoshop® Express application. The example features of growing parent areas 212, 312 and detecting spots 210, 310 described above with reference to FIGS. 2 and 3 can be implemented in other imaging applications.

Figure 4:
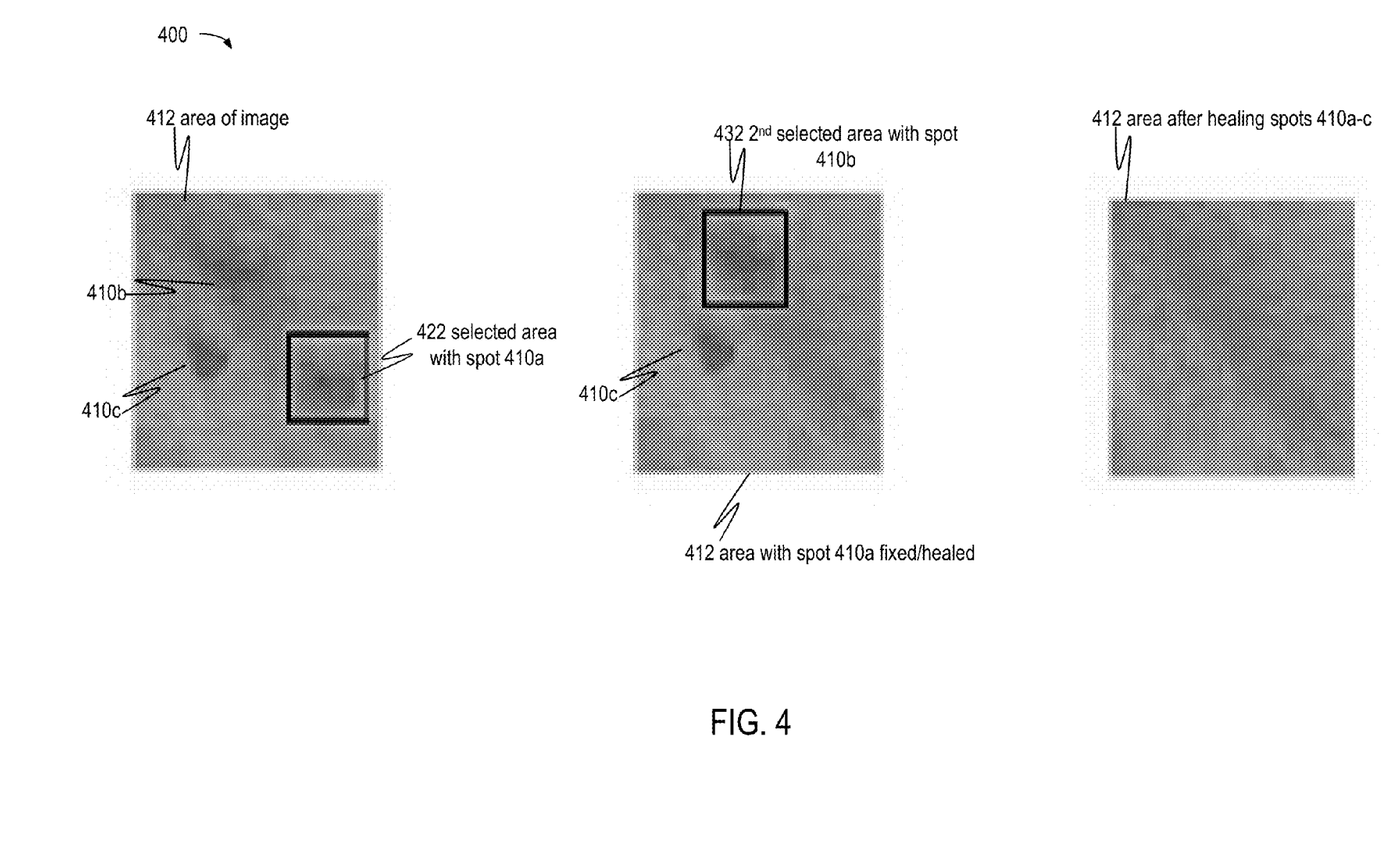
FIG. 4 is a diagram depicting an example process for automatically healing spots in a vicinity of an image, in accordance with various embodiments.

FIG. 4 is a diagram depicting an example process 400 for automatically healing multiple spots 410a-c in a vicinity of an image area 412. Process 400 can handle additional user selections in an image (e.g., further taps or inputs after an initial selection). According to an embodiment, a size constraint may prevent a parent area from increasing by more than double its original size. Thus, according to this example embodiment, it is possible that part of some bigger spot (e.g., spot 410a) and/or additional nearby spots (e.g., spots 410b, 410c) remain unfixed.

According to an example algorithm, one technique never increases the sides of the parent area by more than double. Thus, according to this example embodiment, it is possible that part of some bigger spot still remains unfixed. For example, if a user tries to fix a spot 410a in an area 412 around which we have already run a region-growing algorithm, then process 400 assumes that part of the spot 410a and/or additional spots 410b, 410c must have been left behind (e.g., not yet healed). In such a case, process 400 performs the following steps to fix spots 410a-410c.

Area 412 is an area of an image where there are three spots 410a-c. Process 400 begins when a user selects a first area 422 (e.g., by tapping on the black square shown as area 422 in FIG. 4). Thus, process 400 starts with the initial area 412, where area 412 contains the area for an initial spot 410a to be healed that is within a first selected area 422 that the user has selected to heal. Next, process 400 detects the initial spot 410a in selected area 422 and creates a spot mask. This can be accomplished using processes 200 and 300 described above with reference to FIGS. 2 and 3.

After creating the spot mask, spot 410a is fixed/healed as shown in FIG. 4. However, there are additional spots 410b and 410c that remain unfixed. If the user then selects a second area 432 (e.g., by clicking or tapping on the area 432 within the image), spot 410b in second area 432 is then detected, masked, and healed. Spot 410b can be healed by creating a mask (e.g., similar to mask 320 of FIG. 3) that overlays the area of spot 410b and then replacing pixels in the mask area with pixels from a candidate area within area 412 of the image. For example, process 400 can find pixels in a candidate area within the selected area 432 that are outside the mask and are not classified as being part of spot 410b. These pixels from the candidate area can be used to replace the pixels of spot 410b. At this point, since process 400 knows that the user has already fixed spot 410b in area 432 and spot 410a in the vicinity of area 432, process 400 does not tighten the threshold in the downward direction of area 432. As a result, another spot 410c, which is present in the downward direction from area 432 is also automatically detected and fixed. This occurs because, process 400 causes the area 432 to increase, and thus does not opt for higher pixel value thresholds. This is because the user selection (e.g., a user tap) of area 432 near another spot 410b has given the process 400 more confidence about a hypothesis that either: the spot is bigger than initially expected; or an additional spot 410c is likely to be found in the vicinity of one of area 422 or 432.

An additional or alternative embodiment improves the accuracy of finding initial spot 410a is 'tap correction.' According to this embodiment, when a user taps on a touch sensitive display, then the point where the user thinks he has tapped and the actual point in the image where the tap gets registered are slightly different. This is something that can vary from user to user and device to device. For example, the variance can be based on how a particular user holds a mobile device and which fingers are used to select areas. By keeping track of where the user tapped and where the tap was registered, embodiments can make an intelligent guess on further taps which can help process 400 pinpoint the actual spots 410a-c near selected areas 422 and 432 more easily. In this embodiment, if the user always clicks some pixels offset from the center of a spot consistently for a certain number of times (e.g., n times), process 400 can consider this offset the next time an area is selected (e.g., selection n+1). Then, process 400 can use this information to detect and heal spots near the offset location instead of, or in addition to the location the user clicked on.

Example Methods

Figure 5:
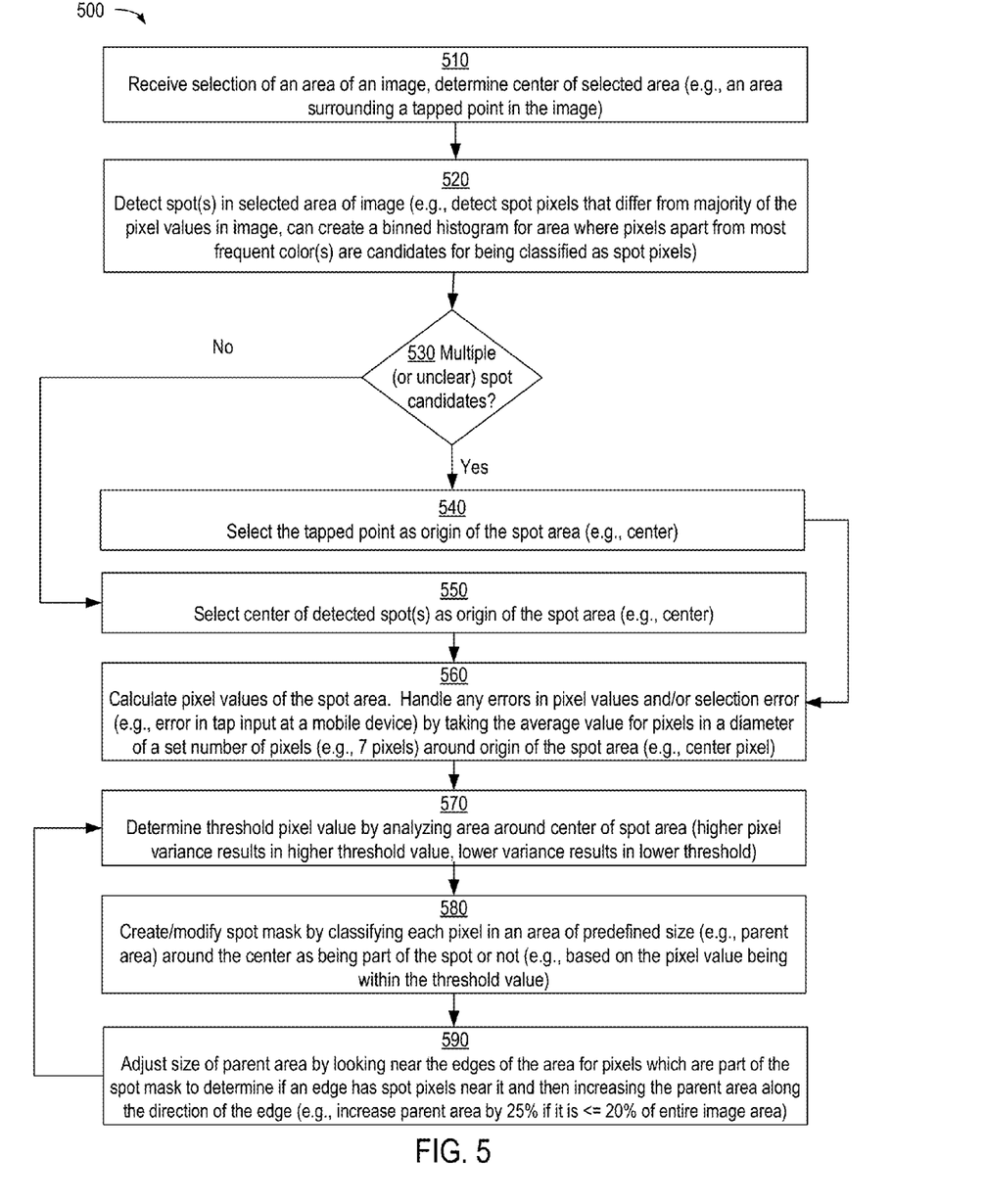
FIG. 5 is a flow chart depicting an example method for identifying spots in images and creating a mask for healing the identified spots, in accordance with various embodiments.

FIG. 5 is a flow chart depicting an example method 500 for identifying spots in images and creating a mask for healing the identified spots. Any suitable process or method can be used to automatically identify spots in an image presented in an imaging application. For example, method 500 can be used to automatically identify spots in an image, and to create masks usable for healing the identified spots. For illustrative purposes, the method 500 is described with reference to the implementations depicted in FIGS. 1-4. Other implementations, however, are possible.

The method 500 involves receiving a selection of an area of an image, and then determining a center of selected area, as depicted in block 510. The selection received at block 510 can be an area surrounding a tapped point in the image. The selection can be received via a mobile imaging application 128a being executed by a suitable processing device to access image data that is stored in a database, data store, or other suitable data structure. The database or other suitable data structure can be stored on a non-transitory computer-readable medium that is included in or accessible to a mobile computing device 104a. The database or data structure can be stored in cloud storage (e.g., memory 108 of server system 102). The imaging application 116 can identify one or more spots to be fixed. For example, one or more modules 117 can be included in imaging application 116. The imaging application 116 can invoke modules 117 to perform operations for determining that an image includes a spot and healing the spot. For example, imaging applications 128a, 128b can also include modules for spot identification and healing.

The method 500 also involves detecting spot(s) in the selected area of image, as depicted in block 520. In the example provided in FIG. 5, block 520 can comprise detecting spot pixels that differ from the majority of the pixel values in the image. As shown, in additional or alternative embodiments, block 520 can be performed by creating a binned histogram for the selected area where pixels that differ from most frequent colors in the image are candidates for being classified as spot pixels.

Next, at block 530, the method 500 also involves determining whether multiple spot candidates were detected. As shown, block 530 can also comprise determining whether the detected spot candidates are unclear. A spot candidate may be determined to be unclear if the pixel values of the spot are within a certain range of a threshold value for the image or when the spot's pixel values are similar to an average pixel value for the image. Conversely, a detected spot candidate may be determined to be a clear if the spot's pixel values exceed the threshold value by a certain amount or fall well outside the image's average pixel value. For example, the imaging application 128a can be executed by processor 118a to determine whether multiple or unclear spot candidates were detected at block 520. If it is determined that multiple or unclear spot candidates were detected, control is passed to block 540. Otherwise, if clear spot candidates (or a single candidate) were detected, control is passed to block 550.

At block 540, the method 500 selects the tapped point as the origin of a spot area (e.g., spot area center).

At block 550, the method 500 selects the center of the spot(s) detected in block 520 as the origin of the spot area (e.g., center of the one or more detected spots).

Then, at block 560, pixel values are calculated for the spot area. As shown, block 560 can include handling any errors in pixel values and/or selection errors (e.g., error in a click or tap input at a touch device or mobile device) by taking the average value for pixels in a diameter of a set number of pixels (e.g., 7 pixels) around an original/center pixel. The center pixel can be the origin of the spot area selected in blocks 540 or 550.

The method 500 also involves determining a threshold pixel value by analyzing an area around the origin/center of the spot area, as depicted in block 570. As shown, higher pixel variance between pixels around the center can result in a higher threshold value being determined in block 570, and lower pixel variance can result in determining a lower threshold.

Next, at block 580, a spot mask is created by classifying each pixel in an area of predefined size (e.g., the parent area) around the origin/center as being part of the spot or not. As shown in FIG. 5, the classification can be based at least in part on the pixel value being within the current threshold value determined at block 570.

Then, at block 590, the size of parent area is adjusted by looking near the edges of the area for pixels which are part of the spot mask to determine if an edge has spot pixels near it. As depicted, block 590 can then increase the parent area along the direction of the edge when an edge has spot pixels on or near it. For example, block 590 can expand parent area by 25% in one or more directions (e.g., downward, leftward, upward, and/or rightward). This expansion can be limited by size and growth constraints. In the example of FIG. 5, a parent area cannot be expanded to be greater than 20% of the entire image area. That is, blocks 570-590 can be repeated to determine a current threshold value, modify the spot mask, and expand the parent area as long as the parent area is still less than 20% of the entire image area. In an additional or alternative embodiment, blocks 570-590 can be repeated until the spot mask area has reached a mask size constraint. This embodiment can limit the spot mask to be no larger than 20% of the image size.

Figure 6:
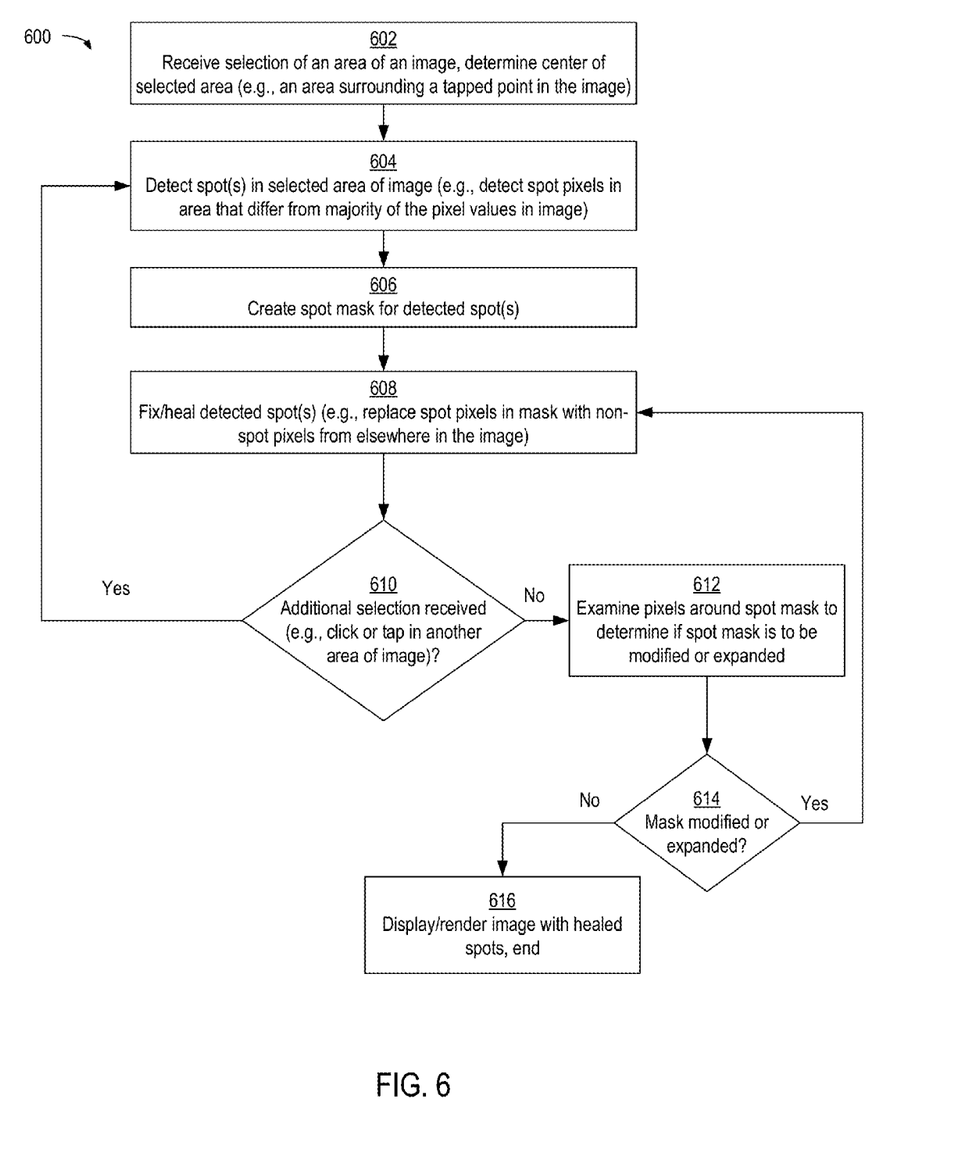
FIG. 6 is a flow chart depicting an example method for healing spots in an image, in accordance with various embodiments.

FIG. 6 is a flow chart depicting an example method 600 for healing spots in an image, in accordance with various embodiments.

The method 600 involves receiving a selection of an area of an image, and then determining a center of selected area, as depicted in block 602. As shown, the selected area can be an area surrounding a tapped point in the image.

The method 600 also involves detecting spot(s) in the selected area of image, as depicted in block 604. In the example provided in FIG. 6, block 604 can comprise detecting spot pixels that differ from the majority of the pixel values in the image.

Next, at block 606, a spot mask is created for the one or more spots detected at block 620. In an embodiment, block 606 can comprise using part of process 300 described above with reference to FIG. 3.

Then, at block 608, the detected one or more spots are healed. As shown the spots can be fixed or healed in block 608 by replacing spot pixels in the spot mask with non-spot pixels from elsewhere in the image. For example, pixels of a blemish or other anomaly in a digital photograph of a person's face can be replaced with skin-tone pixels from elsewhere in the photograph. In one embodiment, block 608 can comprise using process 400 described above with reference to FIG. 4.

The method 600 further involves determining whether an additional selection has been received, as depicted in block 610. As shown, it can be determined in block 610 if an additional click or tap in another area of image has been received. If it is determined that another selection has been received, control is passed to back to block 604 so that blocks 604-608 can be repeated based on the additional selection. Otherwise, control is passed to block 612.

At block 612, pixels around the spot mask are examined to determine if the spot mask needs to be modified or expanded. According to an embodiment, block 612 can comprise using part of process 300 described above with reference to FIG. 3.

Next, at block 614, the method 600 involves determining whether the mask has been expanded or otherwise modified as a result of performing block 612. For example, the shape or size of the spot mask may be modified by carrying our block 612 using process 300 shown in FIG. 3. If it is determined that the mask has been modified, control is passed to back to block 608 so that spot pixels in the modified mask can be replaced with non-spot pixels from elsewhere in the image. Otherwise, control is passed to block 616 where the image with the healed spots is displayed and the method 600 ends.

Example Computer System Implementation

Figure 7:
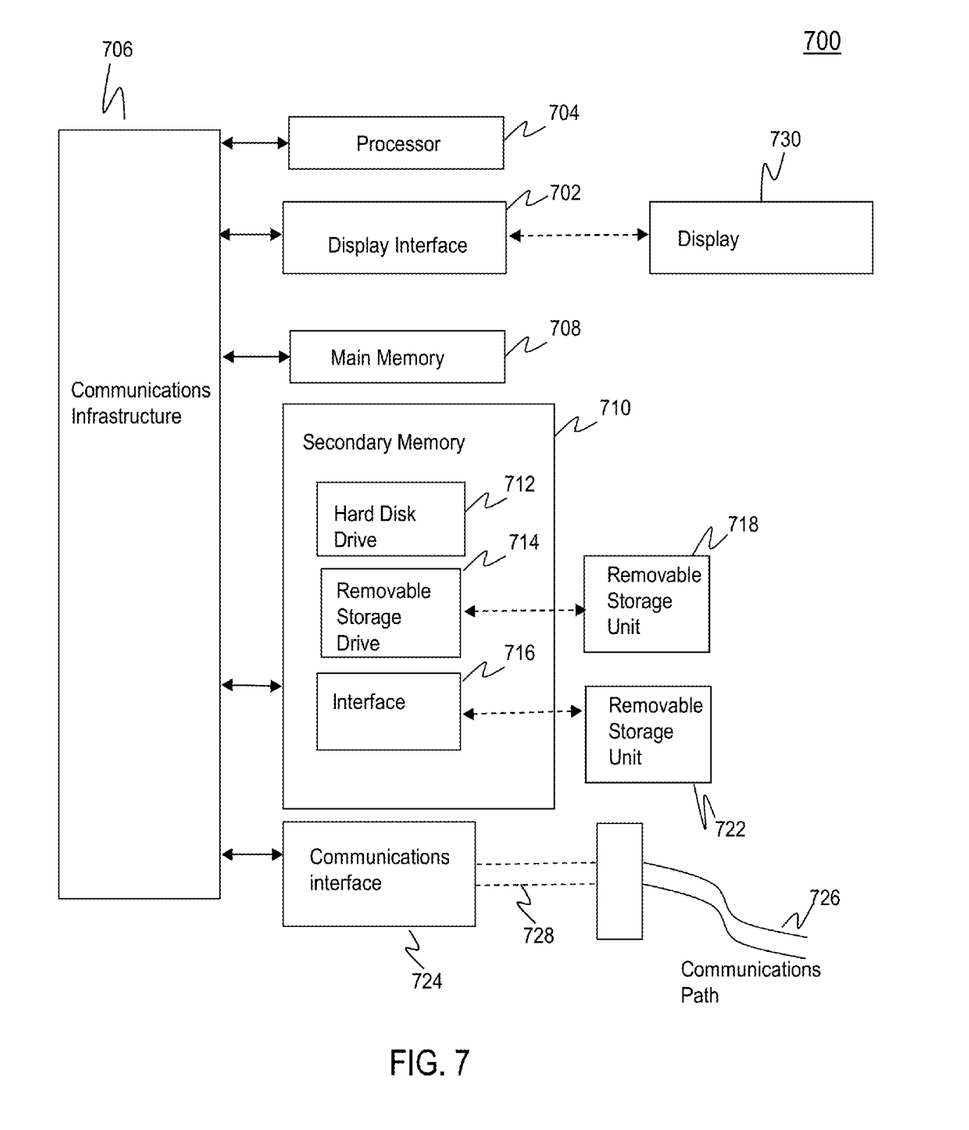
FIG. 7 is a diagram of an exemplary computer system in which one or more embodiments of the present disclosure can be implemented.

Although exemplary embodiments have been described in terms of charging apparatuses, units, systems, and methods, it is contemplated that certain functionality described herein may be implemented in software on microprocessors, such as a microprocessor chip included in the processor 105 of server system 102 and processors 118*a*, 118*b* of computing devices 104*a*, 104*b* shown in FIG. 1, and computing devices such as the computer system 700 illustrated in FIG. 7. In various embodiments, one or more of the functions of the various components may be implemented in software that controls a computing device, such as computer system 700, which is described below with reference to FIG. 7.

Aspects of the present invention shown in FIGS. 1-6, or any part(s) or function(s) thereof, may be implemented using hardware, software modules, firmware, tangible computer readable media having logic or instructions stored thereon, or a combination thereof and may be implemented in one or more computer systems or other processing systems.

FIG. 7 illustrates an example computer system 700 in which embodiments of the present invention, or portions thereof, may be implemented as computer-readable instructions or code. For example, some functionality performed by the computing devices 104*a*, 104*b* and their respective client imaging applications 128*a*, 128*b* shown in FIGS. 3 and 5, can be implemented in the computer system 700 using hardware, software, firmware, non-transitory computer readable media having instructions stored thereon, or a combination thereof and may be implemented in one or more computer systems or other processing systems. Hardware, software, or any combination of such may embody certain modules and components used to implement blocks in the methods 500 and 600 illustrated by the flowcharts of FIGS. 5 and 6 discussed above and the server system 102 and cloud imaging application 116 discussed above with reference to FIG. 1. Similarly, hardware, software, or any combination of such may embody the imaging applications 128*a*, 128*b* on computing devices 104*a*, 104*b* discussed above with reference to FIG. 1.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme. In certain embodiments, one or more of the processors 105, 118*a*, and 118*b* described above with reference to the server system 102, computing device 104*a*, and computing device 104*b* of FIG. 1 can be embodied as the processor device 704 shown in FIG. 7.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like. In non-limiting embodiments, one or more of the memories 108, 120*a*, and 120*b* described above with reference to the server system 102 and computing devices 104*a*, 104*b* of FIG. 1 can be embodied as the main memory 708 shown in FIG. 7.

The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art, removable storage unit 718 includes a non-transitory computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or EEPROM) and associated socket, and other removable storage units 722 and interfaces 720 which allow software and data to be transferred from the removable storage unit 722 to computer system 700. In non-limiting embodiments, one or more of the memories 108, 120*a*, and 120*b* described above with reference to the server system 102 and computing devices 104*a*, and 104*b* of FIG. 1 can be embodied as the main memory 708 shown in FIG. 7.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 708 and secondary memory 710, which can be memory semiconductors (e.g., DRAMs, etc.). Computer readable medium and non-transitory computer readable medium can also refer to removable storage unit 718, removable storage unit 722, and a hard disk installed in hard disk drive 712. Signals carried over communications path 726 can also embody the logic described herein. These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor device 704 to implement the processes of the present invention, such as the blocks in methods 500 and 600 illustrated by the flowcharts of FIGS. 5 and 6, discussed above. Accordingly, such computer programs represent controllers of the computer system 700. Where the invention is implemented using software, the software may be stored in a computer program product and loaded into computer system 700 using removable storage drive 714, interface 720, and hard disk drive 712, or communications interface 724.

In an embodiment, the display devices 126*a*, 126*b* used to display interfaces of imaging applications 128*a* and 128*b*, respectively, may be a computer display 730 shown in FIG. 7. The computer display 730 of computer system 700 can be implemented as a touch sensitive display (e.g., a touch screen). Similarly, the images depicted in FIGS. 2-4 may be rendered using the display interface 702 shown in FIG. 7.

Certain embodiments of the invention also may be directed to computer program products comprising software stored on any computer useable medium. Such software, when executed in one or more data processing device, causes a data processing device(s) to operate as described herein. Some embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Certain embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer implemented method for identifying and healing spots in an image, the method comprising:
   receiving, at a computing device, a selection of an area of the image, the selected area having a center;
   calculating, by the computing device, pixel values of pixels in the selected area;
   determining, based at least in part on the calculated pixel values, a threshold value;
   detecting, based at least in part on comparing pixel values in the selected area to the threshold value, one or more spots in the selected area;
   determining, by the computing device, a center of a parent area by determining a center of the detected one or more spots in the selected area, the parent area having a plurality of edges;
   expanding the parent area in response to determining that an edge of the parent area intersects a pixel included in the one or more spots;
   creating, by the computing device, a mask for the one or more spots, the mask including pixels in the one or more spots that are within the expanded parent area; and
   replacing pixels in the mask with non-spot pixels.

2. The method of claim 1, further comprising, in response to receiving the selection of the area, determining, by the computing device, the center of the selected area by determining a center pixel of the selected area.

3. The method of claim 1, further comprising:
   identifying, based at least in part on the threshold value, if the edge of the parent area intersects a pixel included in the one or more spots;
   in response to determining that the edge includes a pixel in the one or more spots, expanding, in accordance with a growth constraint, the parent area along the edge;
   modifying the mask to include pixels in the one or more spots that are within the expanded parent area; and
   repeating the replacing using the modified mask.

4. The method of claim 1, wherein the receiving comprises:
   receiving a touch input at a touch sensitive display of the computing device; and
   determining the center of the selected area by determining a point in the image corresponding to where the touch input was received.

5. The method of claim 1, wherein the detecting comprises detecting spot pixels having pixel values that differ from a majority of the pixel values in the image.

6. The method of claim 1, wherein the detecting comprises:
   creating a binned histogram for colors of pixels in the image; and
   classifying pixels differing from most frequent colors in the binned histogram as spot pixels.

7. The method of claim 1, wherein calculating the pixel values of the one or more spots comprises taking an average value for pixels in a diameter of a predetermined number of pixels around the center of the selected area.

8. The method of claim 5, wherein a predetermined number of pixels is 7.

9. The method of claim 1, wherein determining the threshold value comprises analyzing pixels in the selected area to determine a level of pixel variance in the selected area.

10. The method of claim 9, wherein a higher pixel variance level results in a higher threshold value, and wherein a lower pixel variance level results in a lower threshold value.

11. The method of claim 1, wherein creating the mask comprises classifying each pixel in the selected area as being part of the one or more spots or not.

12. The method of claim 1, wherein replacing the pixels the mask comprises replacing pixels in the one or more spots with non-spot pixels from elsewhere in the image.

13. The method of claim 1, wherein the non-spot pixels are pixels from the image having a pixel value below the threshold value.

14. A system comprising:
a computing device; and
a non-transitory computer-readable medium communicatively coupled to the computing device, wherein the computing device is configured to execute instructions to perform operations comprising:
receiving a selection of an area of an image, the area having a center;
calculating, by the computing device, pixel values of pixels in the selected area;
determining, based at least in part on the calculated pixel values, a threshold value;
detecting, based at least in part on comparing pixel values in the selected area to the threshold value, one or more spots in the selected area;
determining a center of a parent area by determining a center of the detected one or more spots in the selected area, the parent area having a plurality of edges;
expanding the parent area in response to determining that an edge of the parent area intersects a pixel included in the one or more spots;
creating a mask for the one or more spots, the mask including pixels in the one or more spots that are within the expanded parent area; and
replacing pixels in the mask with non-spot pixels.

15. The system of claim 14, the operations further comprising:
identifying, based at least in part on the threshold value, if the edge of the parent area intersects a pixel included in the one or more spots;
in response to determining that the edge includes a pixel in the one or more spots, expanding, in accordance with a growth constraint, the parent area along the edge;
modifying the mask to include pixels in the one or more spots that are within the expanded parent area; and
replacing pixels in the modified mask with non-spot pixels.

16. The system of claim 15, wherein the growth constraint prevents the edge of the parent area from being expanded by more than 100%.

17. The system of claim 15, wherein the growth constraint prevents the parent area from being expanded to be greater than 20% of an entire area of the image.

18. A non-transitory computer-readable medium having program code stored thereon, the program code comprising:
program code for receiving a selection of an area of an image, the area having a center;
program code for calculating, by the computing device, pixel values of pixels in the selected area;
program code for determining, based at least in part on the calculated pixel values, a threshold value;
program code for detecting, based at least in part on comparing pixel values in the selected area to the threshold value, one or more spots in the selected area;
program code for determining a center of a parent area by determining a center of the detected one or more spots in the selected area, the parent area having a plurality of edges;
program code for expanding the parent area in response to determining that an edge of the parent area intersects a pixel included in the one or more spots;
program code for creating a mask for the one or more spots, the mask including pixels in the one or more spots that are within the expanded parent area; and
program code for replacing pixels in the mask with non-spot pixels.

19. The non-transitory computer-readable medium of claim 18, the program code further comprising:
program code for identifying, based at least in part on the threshold value, if the edge of the parent area intersects a pixel included in the one or more spots;
program code for in response to determining that the edge includes a pixel in the one or more spots, expanding, in accordance with a growth constraint, the parent area along the edge;
program code for modifying the mask to include pixels in the one or more spots that are within the expanded parent area; and
program code for replacing pixels in the modified mask with non-spot pixels.

20. The non-transitory computer-readable medium of claim 19, wherein the growth constraint prevents the parent area from being expanded in any one direction by more than 25% or along any edge by more than 25%.

* * * * *